May 27, 1958     C. W. TYDEMAN     2,836,473
MOUNTING FOR PRELOADING TAPERED ROLLER BEARINGS
Filed July 26, 1957
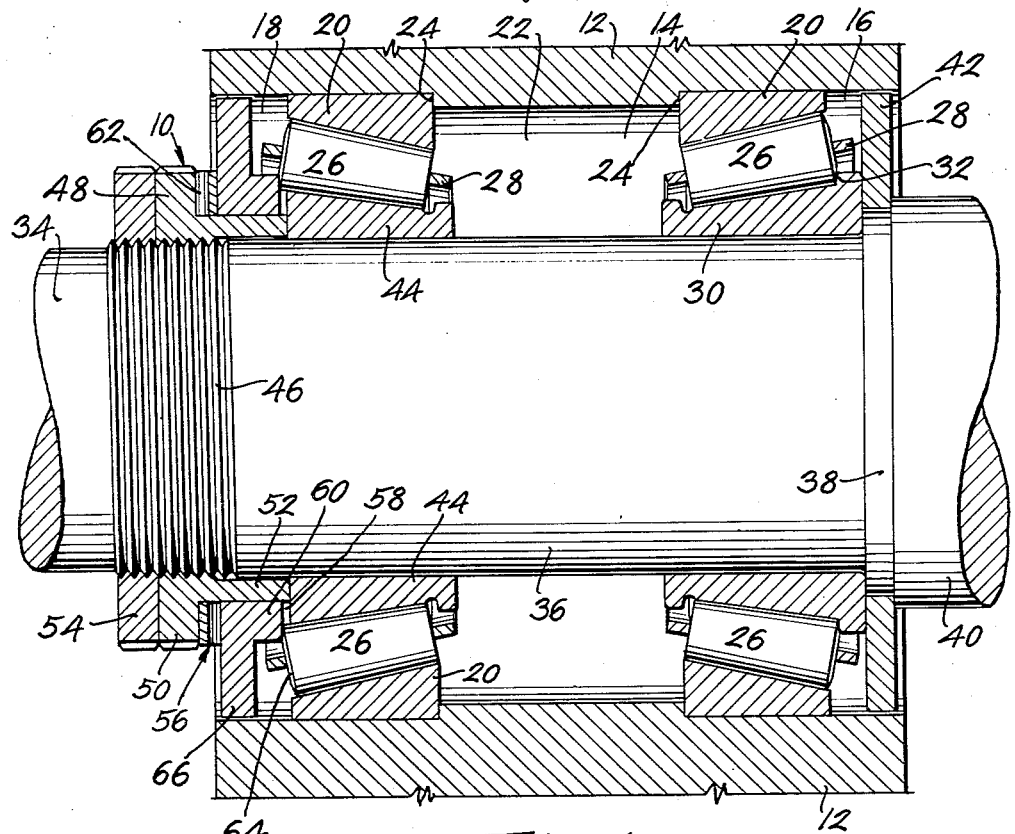
Fig. 1.
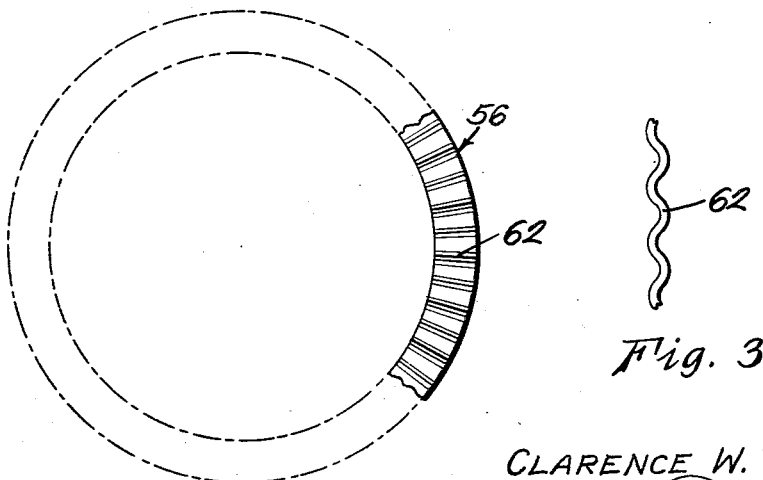
Fig. 2.
Fig. 3.
INVENTOR.
CLARENCE W. TYDEMAN
BY
ATTORNEY

2,836,473

MOUNTING FOR PRELOADING TAPERED ROLLER BEARINGS

Clarence W. Tydeman, Redwood City, Calif.

Application July 26, 1957, Serial No. 674,383

8 Claims. (Cl. 308—207)

This invention relates to roller bearings and, more particularly, to a mounting for preloading tapered roller bearings.

Tapered roller bearings are widely used in many relatively low-speed industrial applications as shaft bearings and thrust bearings. In accordance with conventional practice, the outer cones are held in fixed spaced relation by shoulders on the inside surface of a tubular housing and the inner cones are journaled on the shaft. The inner cones each include annular shoulders in egagement with the rollers at the outer ends thereof and adapted to maintain the rollers in the tapered annular opening between the inner and outer cones. A fixed abutment is provided on one end of the shaft in engagement with one of the inner cones to hold it in position while an axially movable abutment is provided on the shaft in engagement with the other inner cone. This adjustable abutment is used to preload the bearing.

It has been found, however, that the conventional tapered roller bearing mounting above described is only effective for use at shaft speeds below approximately 1500 R. P. M. The critical factor is the thermal expansion of the various elements of the bearing assembly which causes the bearings to tighten and burn out quickly at speeds above 1500 R. P. M. This, of course, is a severe limitation and often becomes the single factor that determines the operational maximum of a given machine design.

It is, therefore, the principal object of the present invention to provide an improved mounting for tapered roller bearings.

A second object is the provision of improved preloading means for tapered roller bearings.

Another object is to provide an expandable preloading assembly incorporated in a mounting for tapered roller bearings that is relatively unaffected by thermal expansion and contraction.

A further object is the provision of a preloading adjustment for tapered roller bearings that maintains a substantially constant preload irrespective of expansion and contraction.

Additional objects are to provide a bearing mounting which is simple, foolproof, compact, and adaptable to a wide variety of industrial applications.

Other objects will be in part apparent and in part pointed out specifically hereinafter in connection with the description of the drawing that follows, in which:

Figure 1 is a fragmentary diametrical section showing the improved tapered roller bearing mounting and preloading means of the present invention;

Figure 2 is a fragmentary plan view of the marcelled spring used therein as the yieldable preloading means; and, Figure 3 is a fragmentary side elevation of the spring.

With reference now to the drawing, and particularly Figure 1 thereof, it will be seen that the improved mounting for tapered roller bearings of the present invention, indicated in a general way by numeral 10, includes a housing or hub 12 having a cylindrical bore 14 with axially spaced sections 16 and 18 of increased diameter at opposite ends thereof. These spaced sections form the seats for the outer cones 20 and are separated from one another by a central section 22 of reduced diameter that forms annular shoulders 24 which function to maintain the outer cones in fixed spaced relation. Conventional tapered roller bearings 26 mounted in frustoconical rings 28 are mounted within the outer cones. A conventional inner cone 30 forms the inner race for one of the bearings and contains an annular shoulder 32 which engages the adjacent rollers and holds them against the tapered face of the corresponding outer cone.

The shaft 34 includes a cylindrical section 36 of reduced diameter upon which inner cone 30 is mounted, an annular shoulder 38 forming a fixed abutment for the inner cone, and a cylindrical section of increased diameter 40 which engages and holds grease plate 42 mounted on shoulder 38 against the bearing. Thus far, a conventional arrangement and construction for journaling a shaft for rotation within a tapered roller bearing assembly has been described. The novelty of the present invention, however, lies in the means by which the bearings are preloaded with a yieldable connection that will now be explained in detail in connection with Figures 1 through 3, inclusive, of the drawing.

The inner cone 44 of one of the bearing assemblies will be seen to have the annular shoulder 32 removed therefrom and be of a width such that the rollers 26 project slightly beyond one face thereof. The adjacent end of the shaft 34 is provided with a threaded section 46 upon which a thrust collar 48 is mounted for axial adjustment. The thrust collar is formed to provide an internally threaded nut portion 50 from which depends an integrally formed tubular extension 52 surrounding the shaft and extending in the direction of inner cone 44. Lock nut 54 abuts the thrust collar and holds it in adjusted position. Axial movement of the thrust collar along the shaft toward shoulder 38 which lies axially spaced therefrom, causes the tubular extension 52 to engage inner cone 44 and preload both bearing assemblies as the loading will be transferred from the thrust collar to cone 44, thence to cone 20 through the rollers, through the hub to the other outer cone and through the rollers to cone 30 which is held fixed against shoulder 38. In this manner, both bearing assemblies are equally preloaded in a manner which is substantially that employed in conventional practice. Lock nut 54 is, of course, turned up tight against the thrust collar to maintain the preloaded condition. The function performed by shoulder 32 of inner cone 30 is, however, taken care of by a yieldable connection indicated in a general way by numeral 56 between the thrust collar and inner cone 44.

An examination of Figure 1 will disclose that an annular channel 58 is formed by inner cone 44, the tubular extension 52 and the nut portion 50 of the thrust collar. A compensating ring 60 and a resilient member 62 are disposed within channel 58, the resilient member being preloaded to urge the ring against the projecting ends 64 of rollers 26 thus forming a yieldable abutment. Thus, under high speed conditions when the bearings become heated and expand, the outer cones 20 will be forced apart slightly due to the elongation of the hub and separation of shoulders 24; however, this expansion will immediately be compensated for by movement of rollers 26 against the ring 60 which further compresses the resilient member against nut portion 50 of the thrust collar and maintains the preloading of the bearings substantially constant. Conversely, any contraction of the elements of the mounting and bearing assemblies will be taken up through expansion of the resilient member against the ring.

In the particular embodiment of the invention illustrated in Figures 1, 2 and 3, the resilient member 62 has been shown as a marcelled spring which is ideally suited for use in the present application; however, it is to be clearly understood that the instant invention is not confined to the use of this specific type of spring as a series of coil or leaf springs could also be used or resilient plastic and rubber inserts, all of which are well known in the art. The compensating ring 60 has been shown provided with an integrally-formed annular flange 66 that functions as a grease seal much in the same manner as plate 42.

Tapered roller bearings mounted in accordance with the teachings of the present invention have been successfully operated over long periods of time at shaft speeds in excess of 4000 R. P. M. without damage thereto; whereas, the conventional bearing mountings cannot be used safely in excess of 1500 R. P. M. The key to the invention, of course, lies in the provision of a yieldable abutment associated with one of the inner cones and in contact with the rollers journaled thereon.

Having thus described the several useful and novel features of the mounting for preloading tapered roller bearings of the present invention, it will be seen that the several objects for which it was designed have been achieved. Although but a single specific embodiment of the present invention has been illustrated in the accompanying drawing, I realize that certain changes and modifications therein can be made and may occur to those skilled in the art within the broad teaching found herein; hence, it is my intention that the scope of protection afforded hereby shall be limited only insofar as said limitations are expressly set forth in the appended claims.

What is claimed is:

1. In a shaft bearing, a hub having a cylindrical bore, first and second outer conical races mounted within the bore, first and second abutments depending from the bore in engagement with the adjacent faces of the first and second outer races respectively maintaining an axially spaced relation therebetween, first and second sets of rollers journaled for rotation within the first and second outer races respectively, first and second inner conical races journaled within the first and second sets of rollers respectively, the first inner race including an annular shoulder in engagement with the outer ends of the first set of rollers, the second inner race terminating short of the outer ends of the second set of rollers, a shaft mounted within the inner races, first and second retaining means depending from the shaft and lapping the opposite faces of the first and second inner races respectively, the second retaining means being axially movable relative to the first retaining means, and resilient means operatively interconnecting the second retaining means and the outer ends of the second set of rollers.

2. The device as set forth in claim 1 in which the resilient means comprises a ring mounted on the second retaining means for axial slidable movement against the outer ends of the second set of rollers and compression spring means mounted between the second retaining means and the ring.

3. The device as set forth in claim 1 in which the rollers are tapered.

4. The device as set forth in claim 1 in which locking means is mounted on the shaft for axial movement into contact with the second retaining means to maintain the adjusted position thereof.

5. The device as set forth in claim 1 in which the second retaining means comprises a tubular member threaded onto the shaft and including an annular flange depending therefrom in axially spaced relation to the outer ends of the second set of rollers.

6. The device as set forth in claim 2 in which the spring means comprises an annular marcelled spring.

7. The device as set forth in claim 5 in which the resilient means comprises a ring mounted upon the tubular member for axial slidable movement against the outer ends of the second set of rollers and compression spring means positioned between the annular flange and the ring.

8. The device as set forth in claim 7 in which the spring means comprises an annular marcelled spring.

References Cited in the file of this patent
UNITED STATES PATENTS

| | | |
|---|---|---|
| 1,757,953 | Chase | May 13, 1930 |
| 2,656,734 | Creson et al. | Oct. 27, 1953 |